(12) United States Patent
Homan et al.

(10) Patent No.: US 6,955,060 B2
(45) Date of Patent: Oct. 18, 2005

(54) AIR CONDITIONER WITH CONTROL OF COMPRESSOR

(75) Inventors: Toshinobu Homan, Obu (JP); Mitsuyo Oomura, Hekinan (JP); Makoto Yoshida, Anjo (JP)

(73) Assignee: Denso Corporation, Kariya (JP)

(*) Notice: Subject to any disclaimer, the term of this patent is extended or adjusted under 35 U.S.C. 154(b) by 7 days.

(21) Appl. No.: 10/809,131

(22) Filed: Mar. 25, 2004

(65) Prior Publication Data

US 2004/0206102 A1 Oct. 21, 2004

(30) Foreign Application Priority Data

Apr. 16, 2003 (JP) .......................... 2003-111719
Aug. 1, 2003 (JP) .......................... 2003-285179

(51) Int. Cl.$^7$ .............................. F25B 1/00; F25B 49/00
(52) U.S. Cl. ........................ 62/228.4; 62/133; 62/229; 62/240
(58) Field of Search ................ 62/133, 228.1, 62/228.4, 229, 240

(56) References Cited

U.S. PATENT DOCUMENTS 5,257,507 A    11/1993   Taguchi
5,709,098 A *  1/1998   Itoh et al. .............. 62/228.4
2001/0018831 A1 * 9/2001  Honda .................... 62/228.1
2004/0172960 A1 * 9/2004  Nakamura et al. ......... 62/228.1

FOREIGN PATENT DOCUMENTS

| JP | 3-67721    | 3/1991  |
| JP | 07-223428  | 8/1995  |
| JP | 8-276730   | 10/1996 |
| JP | 10-175427  | 6/1998  |
| JP | 2001-026214| 1/2001  |

* cited by examiner

*Primary Examiner*—Marc Norman
(74) *Attorney, Agent, or Firm*—Harness, Dickey & Pierce, PLC

(57) ABSTRACT

In an air conditioner, a target compressor rotation speed is determined based on a target air temperature, which represents an air conditioning load, when an electric compressor is started from a stop state. Thus, an evaporator air temperature can be approximated to a target evaporator air temperature, more quickly as compared with a control method where an incremental rotation speed is added to a present rotation speed of the electric compressor, that is, 0 rpm. Accordingly, a large cooling capacity can be obtained for a short time period. Thus, an air temperature in a compartment can be quickly reduced to a comfortable temperature, when the air conditioner is started, for example.

12 Claims, 12 Drawing Sheets

AIR CONDITIONER WITH CONTROL OF COMPRESSOR

CROSS REFERENCE TO RELATED APPLICATION

This application is based on Japanese Patent Applications No. 2003-111719 filed on Apr. 16, 2003 and No. 2003-285179 filed on Aug. 1, 2003, the disclosures of which are incorporated herein by reference.

BACKGROUND OF THE INVENTION

1. Field of the Invention

The present invention relates to an air conditioner. More particularly, the present invention relates to a control system for controlling an electric compressor of the air conditioner.

2. Description of Related Art

In an air conditioner disclosed in JP-A-2001-26214, a control target rotation speed $f_n$ of a compressor is determined as follows. That is, an actual cooling capacity TE (e.g., air temperature immediately after an evaporator) generated in an interior heat exchanger is detected, a target cooling capacity TEO of the interior heat exchanger is determined, and a difference $\Delta TE$ between the TE and the TEO is calculated. Then, an incremental rotation speed $\Delta f$ with respect to a present rotation speed $f_{n-1}$ is determined based on the difference $\Delta TE$, and the control target rotation speed $f_n$ is determined by adding the incremental rotation speed $\Delta f$ to the present rotation speed $f_{n-1}$.

In a feedback control of the air conditioner according to JP-A-2001-26214, the control target rotation speed $f_n$ converges in a stable speed range in any heat load condition. Therefore, an excessive value of the incremental rotation speed $\Delta f$ cannot be set.

Generally, a rotation speed of the compressor changes larger than the incremental rotation speed $\Delta f$ determined as described above, for example, when the compressor is started. In this case, according to the above feedback control, the control target rotation speed $f_n$ is obtained by adding the incremental rotation speed $\Delta f$ to the present rotation speed $f_{n-1}$, that is, 0 rpm. Therefore, the excessive value of the incremental rotation speed $\Delta f$ cannot be set as described above. Accordingly, it takes a long time to increase the rotation speed of the compressor to a necessary speed. Thus, the cooling capacity generated in the interior heat exchanger increases slowly and a sufficient cooling capacity may not be obtained, for example, in a quick cooling operation immediately after starting of the compressor.

SUMMARY OF THE INVENTION

In view of the foregoing problems, it is an object of the present invention to provide an air conditioner in which an actual cooling capacity can be quickly approximated to a target cooling capacity.

According to the present invention, an air conditioner includes a vapor compression refrigerant cycle that includes a compressor for compressing refrigerant and an interior heat exchanger for adjusting a temperature of air to be blown into a compartment by performing heat exchange between refrigerant circulating in the vapor compression refrigerant cycle and the air to be blown into the compartment. The air conditioner further includes an actual capacity detecting means for detecting an actual capacity of the interior heat exchanger, a target capacity determining means for determining a target capacity of the interior heat exchanger, a first target rotation-speed determining means for determining a first control target rotation speed of the compressor based on a difference between the actual capacity detected by the actual capacity detecting means and the target capacity determined by the target capacity determining means, a changing condition determining means for determining whether a rotation speed of the compressor needs to be changed by a change rate larger than a change rate of the first control target rotation speed determined by the first target rotation-speed determining means, and a second target rotation-speed determining means for determining a second control target rotation speed that is larger than the first control target rotation speed when the changing condition determining means determines that the rotation speed of the compressor needs to be changed by a change rate larger than the change rate of the first control target rotation speed.

Thus, a capacity of the interior heat exchanger can be more rapidly approximated to a target capacity as compared with a case where the rotation speed of the compressor is determined only by the first target rotation-speed determining means. Therefore, a large cooling capacity can be obtained for a short time period. Accordingly, a temperature in the compartment can be quickly reduced to a comfortable temperature when the air conditioner is started.

For example, the changing condition determining means determines that the rotation speed of the compressor needs to be changed by a change rate larger than the change rate of the first control target rotation speed, when the compressor is started from a stop state.

Preferably, the air conditioner includes a guard rotation speed determining means for determining a maximum permissible rotation speed of the compressor. In this case, the changing condition determining means determines that the rotation speed of the compressor needs to be changed by a change rate larger than the change rate of the first control target rotation speed determined by the first target rotation-speed determining means, when the maximum permissible rotation speed determined by the guard rotation speed determining means increases and a difference between the control target rotation speed determined by the first target rotation-speed determining means and an actual rotation speed of the compressor is larger than a predetermined value. Alternatively, the changing condition determining means determines that the rotation speed of the compressor needs to be changed at a change rate larger than the change rate of the first control target rotation speed determined by the first target rotation-speed determining means, when the maximum permissible rotation speed determined by the guard rotation speed determining means increases and a difference between the actual capacity detected by the actual capacity detecting means and the target capacity determined by the target capacity determining means is larger than a predetermined value.

Alternatively, the changing condition determining means determines that the rotation speed of the compressor needs to be changed by a change rate larger than the change rate of the second control target rotation speed determined by the first target rotation-speed determining means, when the maximum permissible rotation speed determined by the guard rotation speed determining means increases and a difference between an air temperature of the passenger compartment and a set temperature set by the temperature setting unit is larger than a predetermined value.

Preferably, the second target rotation-speed determining means determines the second control target rotation speed of the compressor based on a target temperature of air blown into the compartment. Alternatively, the second target rotation-speed determining means determines the second control target rotation speed of the compressor by correcting the first control target rotation speed determined by the first target rotation-speed determining means. For example, the second target rotation-speed determining means corrects the first control target rotation speed determined by the first target rotation-speed determining means based on an air conditioning load of the interior heat exchanger.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

(First Embodiment)

The first embodiment of the present invention will be now described with reference to FIGS. 1–6.

Figure 1:
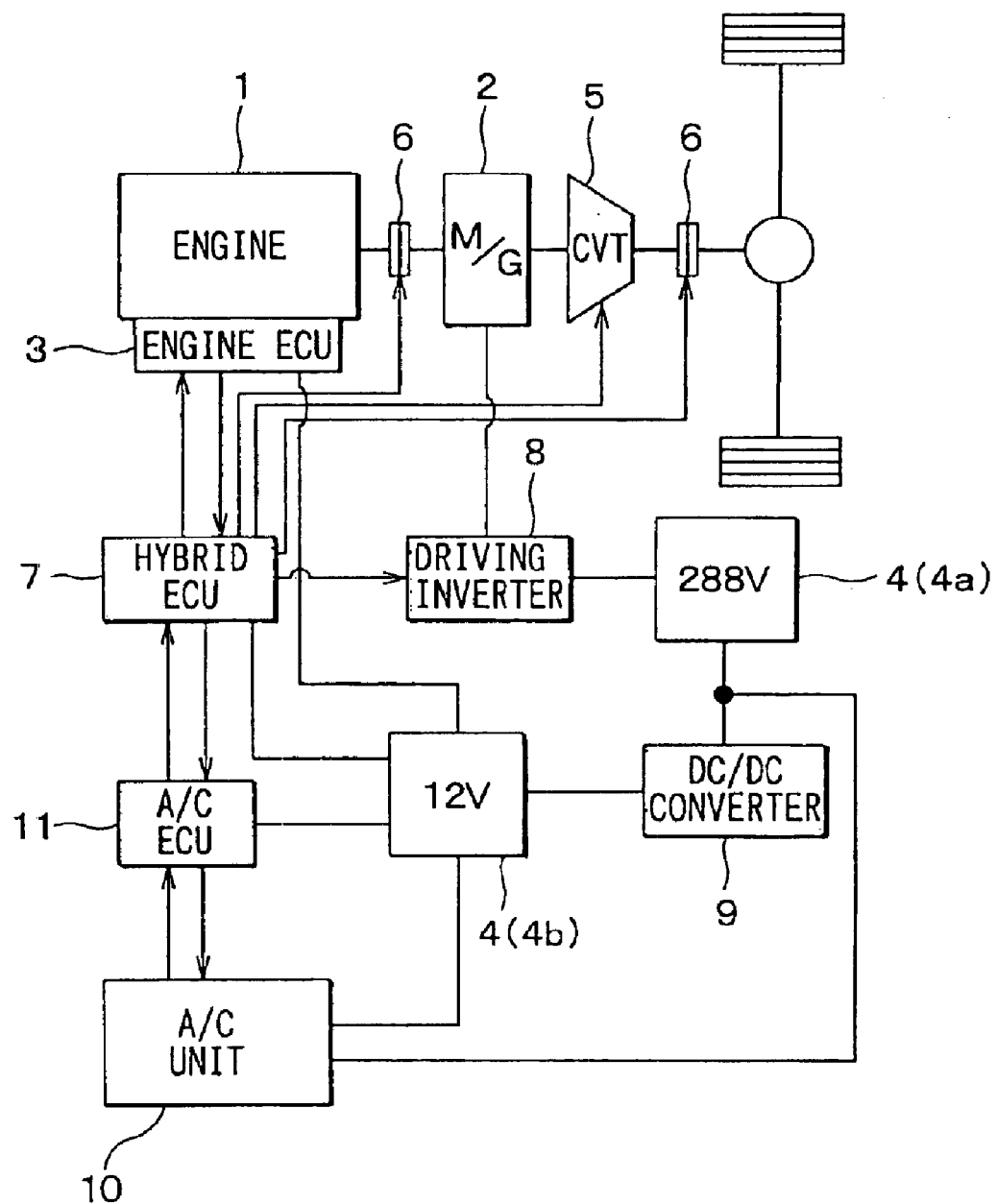
FIG. 1 is a schematic diagram showing an entire structure of a hybrid vehicle on which an air conditioner according to a first embodiment of the present invention is mounted.

In the first embodiment, an air conditioner of the present invention is typically used for a hybrid vehicle. As shown in FIG. 1, the hybrid vehicle includes an engine 1, an electric motor generator 2, an engine electronic control unit (ECU) 3, a battery 4 and a hybrid ECU (driving ECU) 7. The engine 1 is an internal combustion engine for generating motive power by exploding and burning liquid fuel such as gasoline. The electric motor generator 2 includes a motor function for an auxiliary driving of the vehicle and a generator function.

The engine ECU 3 controls an amount of fuel supplied to the engine 1, an ignition time and the like. The battery 4 is a secondary battery which supplies electric power to the electric motor generator 2, the engine ECU 3 and the like. For example, the battery 4 is a nickel-hydrogen storage battery and is composed of a main battery $4a$ with a high voltage (e.g., 288 V) and a sub-battery $4b$ with a low voltage (e.g., 12 V). The hybrid ECU 7 controls the electric motor generator 2, a continuously variable transmission 5 and an electromagnetic clutch 6. Furthermore, the hybrid ECU 7 outputs control signals (e.g., target values of a rotation speed and a torque of the engine 1) to the engine ECU 3.

The hybrid ECU 7 has a function for controlling a drive switching, that is, a function for determining a driving source among the engine 1 and the electric motor generator 2. Therefore, a driving force from at least one of the engine 1 and the electric motor generator 2 is supplied to driving wheels of the vehicle. In addition, the hybrid ECU 7 has a function for controlling charge and discharge of the battery 4.

Specifically, the following control is basically performed by the hybrid ECU 7.

(1) When the vehicle is stopped, that is, when a vehicle speed is about 0 km/h, the engine 1 is stopped.

(2) When the vehicle runs, a driving force generated in the engine 1 is transmitted to the driving wheels, except for in a case where the vehicle is in a deceleration state. In the deceleration state of the vehicle, the engine 1 is stopped and the battery 4 is charged by electric power generated in the electric motor generator 2.

(3) When a running load is large such as in a case where the vehicle starts running, the vehicle is accelerated, the vehicle is going up in a slope, or the vehicle runs at high speed, the electric motor generator 2 is used as the electric motor, so that driving force generated in the electric motor generator 2 is also transmitted to the driving wheels in addition to the driving force generated in the engine 1. In the first embodiment, the running load of the vehicle can be calculated based on a vehicle speed or a pedaled amount of an acceleration pedal.

(4) When a residual charging degree of the main battery $4a$ is equal to or lower than a target value for starting the charging of the battery 4 while the vehicle is running, the motive power from the engine 1 is transmitted to the electric motor generator 2, so that the electric motor generator 2 is operated as the generator to charge the battery 4.

(5) When the residual charging degree of the battery 4 is equal to or lower than the target value for starting the charging of the battery 4 while the vehicle is stopped, a signal for starting the engine 1 is sent to the engine ECU 3. Therefore, the engine 1 is driven, and the motive power is transmitted to the electric motor generator 2.

In the first embodiment, the charging start target value for starting the charging of the battery 4 is a threshold value of the residual charging degree for starting the charging, and is indicated by percentage when the full charging degree is 100.

The engine ECU 3 suitably controls the amount of fuel supplied to the engine 1, the ignition timing and the like based on control signals from the hybrid ECU 7, so that the rotation speed of the engine 1 and the torque thereof can be controlled at target values and high fuel-combustion efficiency can be obtained in the engine 1.

The electric motor generator 2 functions as an electric motor for generating motive power when electric power is supplied thereto from the battery 4. To the contrary, the electric motor generator 2 functions as a generator for generating electric power when it is driven by the engine 1.

A driving inverter 8 is a frequency transformer for changing a frequency of voltage or current of electric power between the electric motor generator 2 and the main battery $4a$. A DC/DC converter 9 is a transformer for changing voltage of electric power between the main battery $4a$ and the sub-battery $4b$.

The continuously variable transmission 5 is disposed for changing a speed reduction ratio of the driving force generated in the engine 1 and the electric motor generator 2. The electromagnetic clutch 6 is disposed to interrupt the transmission of the driving force.

The air conditioner is an automatic controlled type air conditioner. Specifically, the air conditioner includes an air conditioning unit 10 mounted in a passenger compartment, a vapor compression refrigerant cycle 20, an air-conditioning ECU 11 and the like. The air-conditioning ECU 11 controls components in the air conditioning unit 10, an electric compressor 21 in the vapor compression refrigerant cycle 20 and the like.

Figure 2:
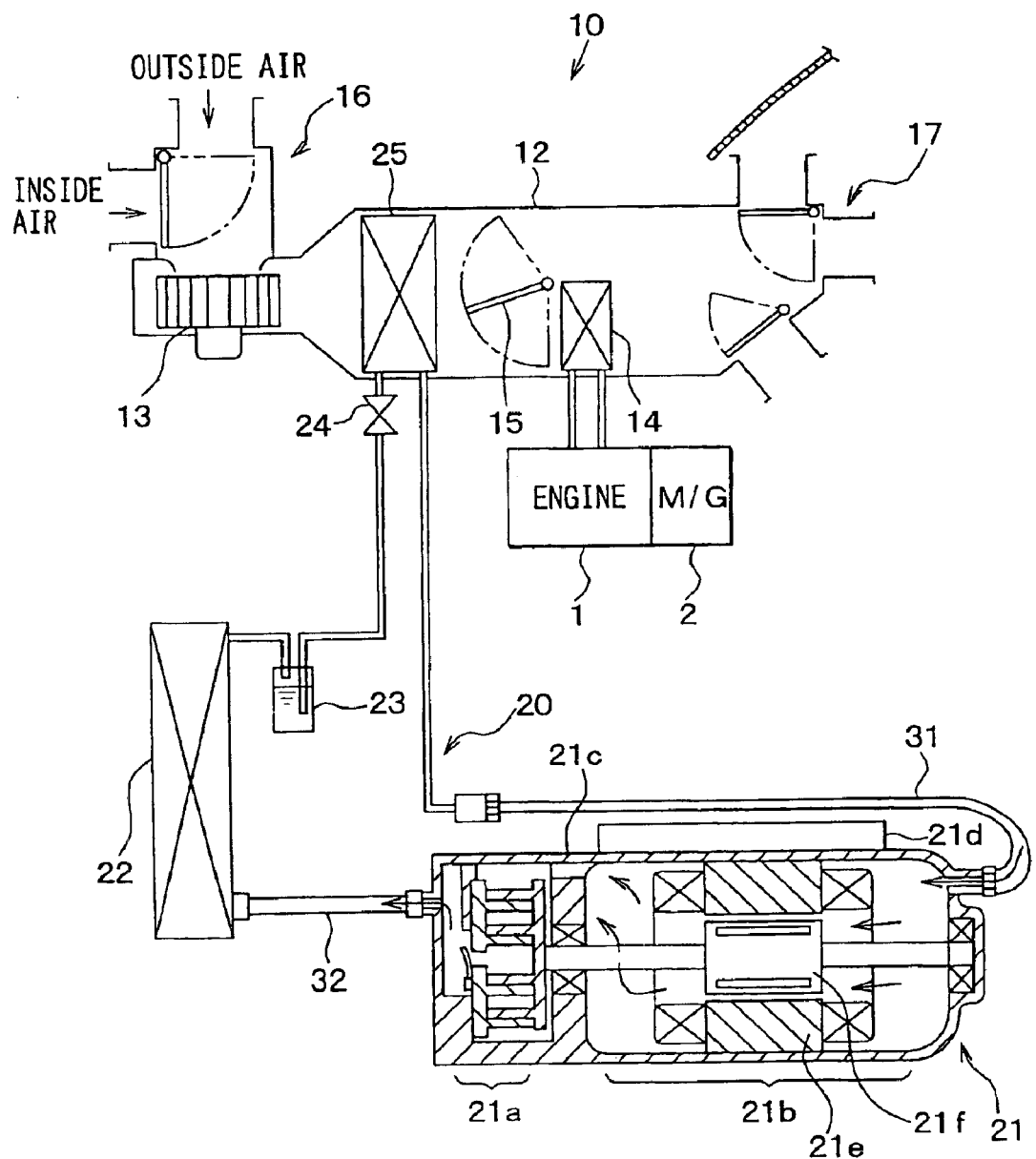
FIG. 2 is a schematic diagram showing an entire structure of the air conditioner according to the first embodiment.
Figure 3:
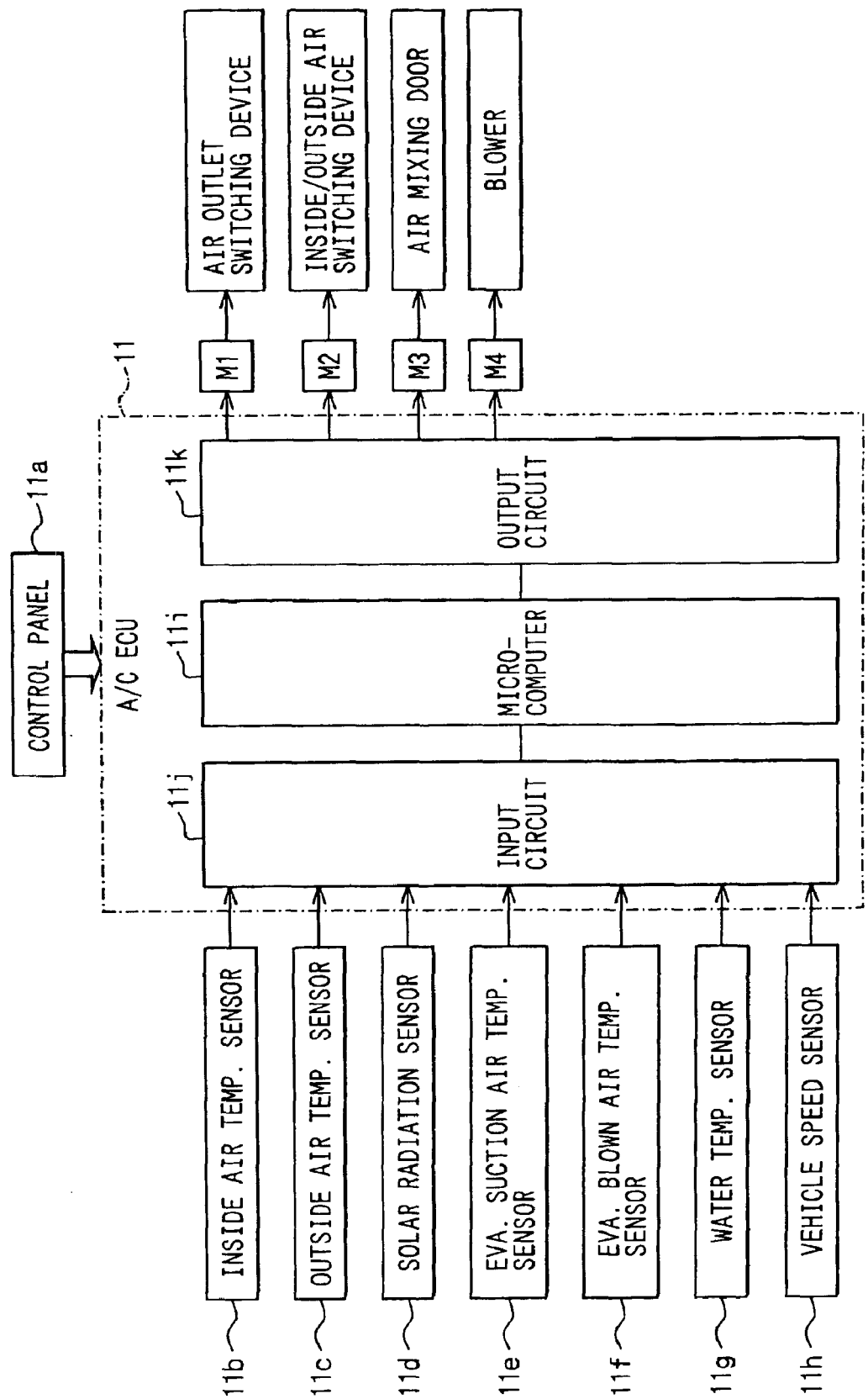
FIG. 3 is a block diagram showing a control system of the air conditioner according to the first embodiment.

As shown in FIG. 2, the air conditioning unit 10 includes an air-conditioning casing 12, a centrifugal type blower 13, an evaporator 25, a heater 14, an air mixing door 15 and the like. The air-conditioning casing 12 is disposed at a front side in the passenger compartment to define an air passage through which air is introduced into the passenger compartment. The centrifugal type blower 13 blows air in the air-conditioning casing 12. The evaporator 25 cools air flowing in the air-conditioning casing 12. The heater 14 heats air flowing in the air-conditioning casing 12 by using waste heat generated in the engine 1 or the like as a heat source. The air mixing door 15 adjusts an amount of cool air, which bypasses the heater 14 and flows toward downstream, and an amount of warm air which is heated by the heater 14 and flows toward downstream.

An inside/outside air switching device 16 is disposed at the most upstream air side of the air-conditioning casing 12. The inside/outside air switching device 16 selectively introduces inside air inside the passenger compartment and outside air outside the passenger compartment. The inside/outside air switching device 16 adjusts a ratio of the inside air and the outside air to be introduced into the air-conditioning casing 12. At the most downstream air side of the air-conditioning casing 12, an air outlet mode switching device 17 is disposed to switch an air outlet mode of air blown in the passenger compartment.

The air outlet mode switching device 17 switches an air outlet mode by selectively opening and closing a defroster opening portion, a face opening portion, a foot opening portion and the like. The defroster opening portion is for blowing air toward an inner surface of a vehicle windshield. The face opening portion is for blowing air toward an upper half body of a passenger in the passenger compartment. The foot opening portion is for blowing air to a foot portion of the passenger.

The vapor compression refrigerant cycle 20 is constructed with a compressor portion $21a$, a condenser 22, a gas-liquid separator 23, an expansion valve 24, the evaporator 25 and the like. The compressor portion $21a$ sucks and compresses refrigerant. The condenser 22 is a high-pressure side heat exchanger which cools the refrigerant by exchanging heat between the compressed refrigerant and the outside air. The gas-liquid separator 23 separates the condensed refrigerant into gas refrigerant and liquid refrigerant, so that the liquid refrigerant is supplied to the expansion valve 24 while the liquid refrigerant is stored as residual refrigerant. The expansion valve 24 decompresses and expands the refrigerant supplied from the gas-liquid separator 23. The evaporator 25 is a low-pressure side heat exchanger which performs heat exchange between the decompressed and expanded refrigerant and air to be blown in the passenger compartment so that air passing through the evaporator 25 is cooled.

In the first embodiment, the expansion valve 24 is a thermal expansion valve which controls a throttle opening degree so that a degree of superheating of the refrigerant at a refrigerant outlet of the evaporator 25 is controlled at a predetermined value. However, the first embodiment is not limited to this. A fixed throttle having a fixed opening degree, for example, an orifice or a capillary tube can also be used.

In the electric compressor 21 of the first embodiment, the compressor portion $21a$ is integrated into an electric motor $21b$ while the compressor portion $21a$ is driven by the electric motor $21b$. A rotation speed of the electric motor $21b$, that is, a rotation speed of the compressor portion $21a$ is controlled by an inverter-type driving control circuit $21d$ which is integrated into a motor housing $21c$.

The driving control circuit $21d$ converts DC current supplied from the main battery $4a$ to AC current of a predetermined frequency and controls the rotation speed of the electric motor $21b$.

The electric motor $21b$ includes a stator $21e$, a rotor $21f$ and the like. The stator $21e$ is fixed to an inner wall of the motor housing $21c$. The rotor $21f$ rotates in the stator $21e$. In the first embodiment, a DC brushless motor, in which the stator $21e$ is a coil and the rotor $21f$ is a magnet, is used as the electric motor $21b$. Further, a refrigerant passage is provided in the motor housing $21c$, so that the electric motor $21b$ is cooled.

In the control system according to the first embodiment, the air-conditioning ECU 11, the hybrid ECU 7 and the engine ECU 3 can communicate with each other. In the first embodiment, they communicate based on a predetermined communication protocol.

Communication signals from the hybrid ECU 7, switch signals from multiple switches provided on a control panel $11a$ at a front side of the passenger compartment, and sensor signals from multiple sensors are inputted into the air-conditioning ECU 11.

The multiple switches provided on the control panel $11a$ include an air conditioning switch, a suction port changing over switch, a temperature setting lever, an air amount changing over switch, an air outlet mode changing over switch and the like. The air conditioning switch is for starting and stopping of operation of the vapor compression refrigerant cycle 20, that is, the compressor portion $21a$. The suction port changing over switch selects an air suction mode by controlling the inside/outside air switching device 16. The temperature setting lever sets a temperature in the passenger compartment to a requested temperature. The air amount changing over switch selects an amount of air blown by the blower 13. The air outlet mode changing over switch selects an air outlet mode by controlling air outlet mode switching device 17.

The multiple sensors include an inside air temperature sensor 11b, an outside air temperature sensor 11c, a solar radiation sensor 11d, an evaporator suction air temperature sensor 11e, an evaporator blown air temperature sensor (post-evaporator air temperature sensor) 11f, a water temperature sensor 11g, a vehicle speed sensor 11h and the like. The inside air temperature sensor 11b detects an air temperature in the passenger compartment. The outside air temperature sensor 11c detects an air temperature outside the passenger compartment. The solar radiation sensor 11d detects an amount of sunlight radiated into the passenger compartment. The evaporator suction air temperature sensor 11e detects a temperature (evaporator suction temperature) of air flowing into the evaporator 25. The evaporator blown air temperature sensor 11f detects a temperature of air immediately after flowing through the evaporator 25. The water temperature sensor 11g detects a temperature of the cooling water flowing into the heater 14. The vehicle speed sensor 11h detects a vehicle speed.

A microcomputer 11i including devices such as a central processing unit (CPU), a read only memory (ROM) and a random access memory (RAM) is provided in the air-conditioning ECU 11. The sensor signals from the sensors 11b–11h are processed (e.g., analog-digital conversion) by an input circuit 11j in the air-conditioning ECU 11. Thereafter, the processed signals are inputted to the microcomputer 11i.

Control signals outputted from the microcomputer 11i are processed (e.g., digital-analog conversion, amplification) by an output circuit 11k in the air-conditioning ECU 11 and the processed signals are outputted to multiple actuators M1–M4 for driving the air mixing door 15 and other devices.

Figure 4:
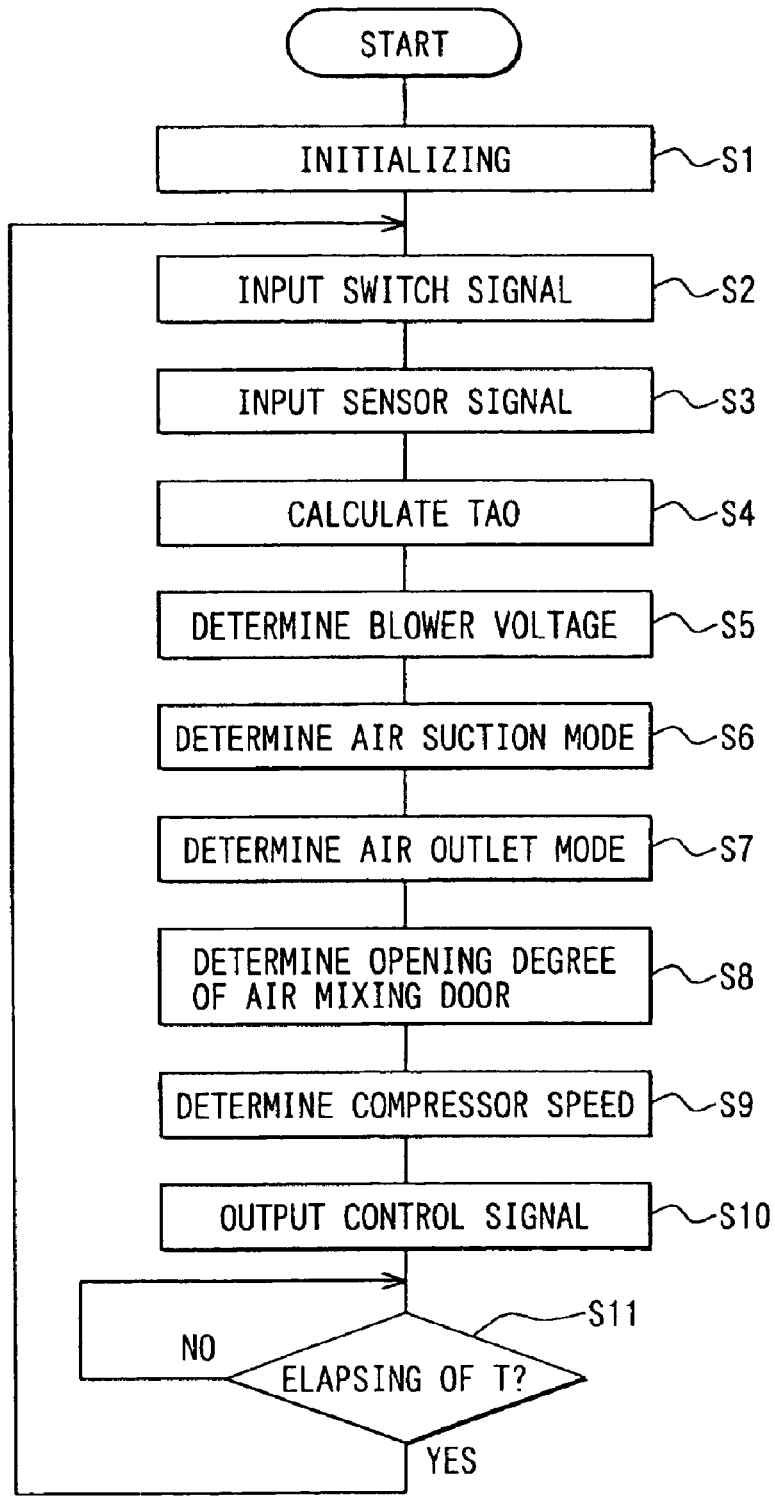
FIG. 4 is a flow diagram showing basic control processes of an air-conditioning ECU.

Next, a basic control of the air-conditioning ECU 11 will be now described with reference to FIG. 4. First, initial setting is performed at step S1 when an ignition switch is turned on and power source is supplied to the air-conditioning ECU 11. Next, at step S2, the air-conditioning ECU 11 reads the switch signals from the switches such as the temperature setting lever.

At step S3, the air-conditioning ECU 11 reads the sensor signals from the inside air temperature sensor 11b, the outside air temperature sensor 11c, the solar radiation sensor 11d, the evaporator suction air temperature sensor 11e, the evaporator blown air temperature sensor 11f, the water temperature sensor 11g, the vehicle speed sensor 11h and the like.

At step S4, a temperature of air to be blown into the passenger compartment, that is, a target air temperature TAO is calculated based on the following formula (1) beforehand stored in the ROM.

$$TAO = Kset \times Tset - KR \times TR - KAM \times TAM - KS \times TS + C \quad (1)$$

Wherein, Tset indicates a temperature set by the temperature setting lever, TR indicates an inside air temperature detected by the inside air temperature sensor 11b, TAM indicates an outside air temperature detected by the outside air temperature sensor 11c, and TS indicates a solar radiation amount detected by the solar radiation sensor 11d. Kset, KR, KAM and KS indicate gain coefficients respectively, and C indicates a correction constant.

At step S5, a blower voltage, that is, voltage applied to a fan motor of the blower 13 corresponding to the target air temperature TAO is determined by using a characteristic graph beforehand stored in the ROM. Specifically, as a difference between the target air temperature TAO and the set temperature becomes larger, the blower voltage is made higher so that the air blowing amount is increased. To the contrary, as the difference between the target air temperature TAO and the set temperature becomes smaller, the blower voltage is made lower so that the air blowing amount is decreased.

Next, at step S6, the air suction mode corresponding to the target air temperature TAO is determined by using a characteristic graph beforehand stored in the ROM. Specifically, when the target air temperature TAO is high, an inside air circulation mode is selected. When the target air temperature TAO is low, an outside air introduction mode is selected.

At step S7, the air outlet mode corresponding to the target air temperature TAO is determined by using a characteristic graph beforehand stored in the ROM. Specifically, when the target air temperature TAO is low, the foot mode is selected. As the target air temperature TAO becomes higher, the air outlet mode is selected from the foot mode to the face mode through the bi-level mode.

Further, the electric compressor 21 or the driving control circuit 21d for controlling the electric compressor 21 (the electric motor 21b) may break down. In this case, the outside air introduction mode is forcibly selected even in the inside air circulation mode.

At step S8, an opening degree of the air mixing door 15 is determined according to the target air temperature TAO, an evaporator air temperature detected by the evaporator blown air temperature sensor 11f, a cooling water temperature detected by the water sensor 11g and the like.

Figure 5:
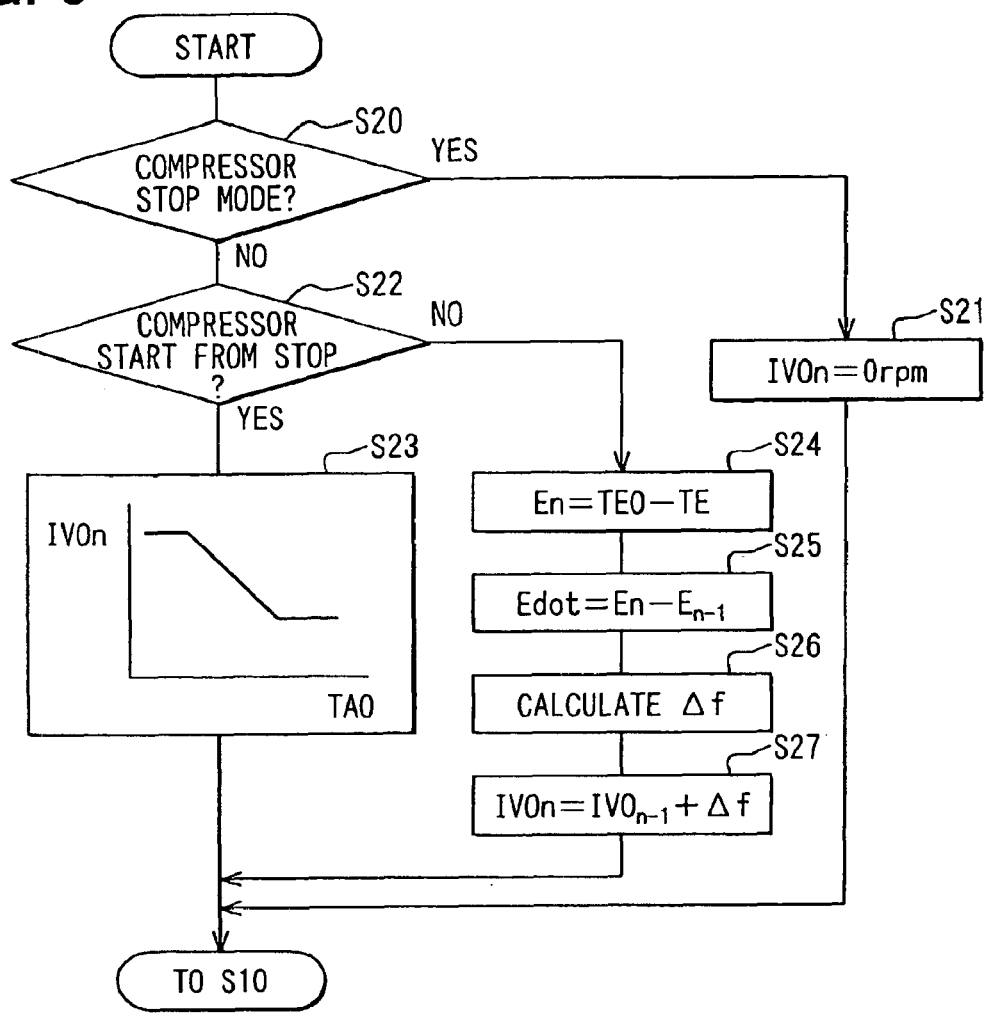
FIG. 5 is a flow diagram showing a compressor control in step S9 of FIG. 4, according to the first embodiment.

At step S9, the rotation speed of the electric compressor 21 is determined based on a subroutine control shown in FIG. 5. At step S10, control signals are outputted to the actuators, a blower driving circuit and the hybrid ECU 7 in order to obtain each of the control states calculated or determined at steps S4–S9. After a predetermined time T is elapsed at step S11, the control program returns to step S2.

Next, the subroutine for determining the rotation speed of the electric compressor 21 will be now described with reference to FIG. 5. At step S20, it is determined whether the electric compressor 21 needs to be started based on ON/OFF state of the air conditioning switch or the defroster switch. When it is determined that the electric compressor 21 does not need to be started, that is, when a compressor stop mode is set, a target compressor rotation speed $IVO_n$ is set to 0 rpm at step S21.

When it is determined that the electric compressor 21 needs to be started, it is determined whether the electric compressor 21 is started from a stopped state, that is, whether a former target compressor rotation speed $IVO_{n-1}$ is 0 rpm, at step S22. When the former target compressor rotation speed $IVO_{n-1}$ is 0 rpm, the target rotation speed $IVO_n$ is directly determined based on the target air temperature TAO representing a magnitude of an air conditioning load at step S23. Specifically, as shown in a graph at step S23 in FIG. 5, the target compressor rotation speed $IVO_n$ is set to be larger as the target air temperature TAO decreases within a predetermined range of the target air temperature TAO.

When the former target compressor rotation speed $IVO_{n-1}$ is not 0 rpm at step S22, a target evaporator air temperature TEO is calculated based on the sensor signals from the multiple sensors 11b–11h, and the target compressor rotation speed $IVO_n$ is calculated based on the target evaporator air temperature TEO at steps S24–S27.

Specifically, a difference En between the target evaporator air temperature TEO and an evaporator air temperature TE detected by the evaporator blown air temperature sensor 11f, and a difference change rate Edot are calculated based on the following formulas (2) and (3).

$$E_n = TEO - TE \quad (2)$$

$$Edot = E_n - E_{n-1} \quad (3)$$

Wherein $E_{n-1}$ indicates a former value of the present difference $E_n$. Because the difference $E_n$ is calculated every 4 seconds, the former difference $E_{n-1}$ is a value which is calculated 4 seconds prior to the present time where the difference $E_n$ is calculated.

Next, a target incremental rotation speed Δf (rpm) at the difference $E_n$ and the difference change rate Edot is calculated based on a predetermined membership function and a rule stored in the ROM.

Here, the target incremental rotation speed Δf is a change of the rotation speed of the compressor portion 21a from the former target compressor rotation speed $IVO_{n-1}$, that is, from the target compressor rotation speed 4 seconds prior to the present time.

Next, operation and advantages of the air conditioner according to the first embodiment will be explained.

Figure 6:
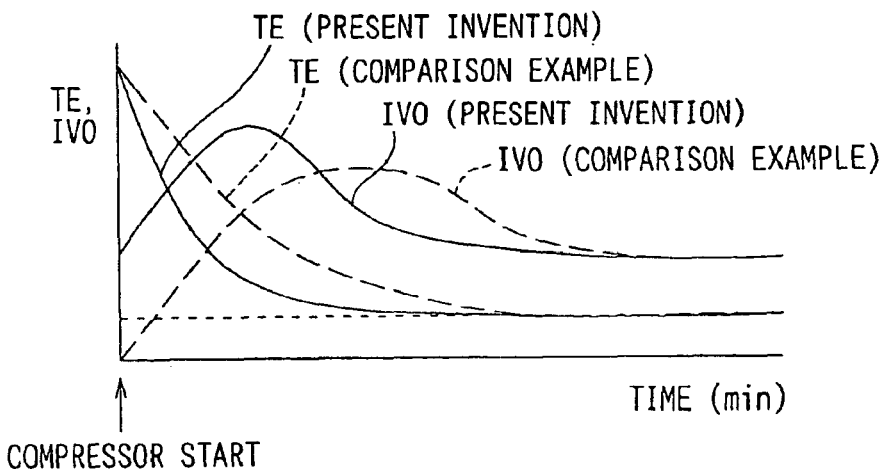
FIG. 6 is a graph showing a rotation speed (IVO) of the compressor and an evaporator air temperature (TE) according to the first embodiment and a comparison example.

In the first embodiment, for example, when the electric compressor 21 is started, the rotation speed of the electric compressor 21 changes larger than the incremental rotation speed Δf determined based on a difference between the evaporator air temperature TE representing an actual cooling capacity and the target evaporator air temperature TEO representing a target cooling capacity. That is, in the first embodiment, when the electric compressor 21 is started from the stop state, the target compressor rotation speed IVO is directly determined based on the target air temperature TAO representing the magnitude of the air conditioning load. Accordingly, the evaporator air temperature TE can be approximated to the target evaporator air temperature TEO quickly. As shown in FIG. 6, this effect is larger than that of a control in a comparison example where the present rotation speed $f_{n-1}$ of the electric compressor 21 is calculated only by adding the incremental rotation speed Δf to the former rotation speed $f_{n-1}$ of 0 rpm.

As shown in FIG. 6, in the first embodiment of the present invention, a large cooling capacity can be obtained in a short time period as compared with the comparison example. Therefore, in the first embodiment, a temperature in the passenger compartment can be quickly reduced to a comfortable temperature in a quick cooling operation, for example, when the air conditioner is started in summer.

(Second Embodiment)

Figure 7:
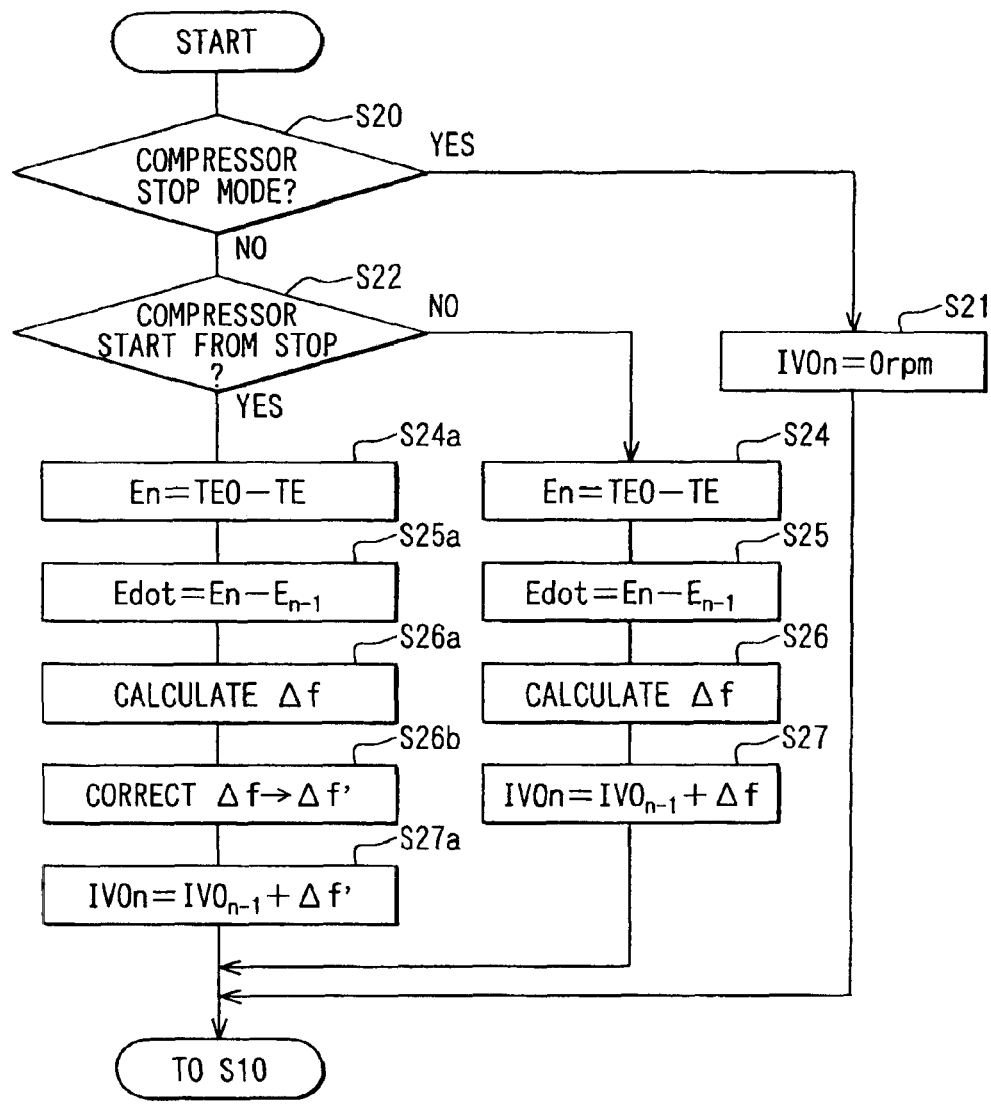
FIG. 7 is a flow diagram showing a compressor control in step S9 of FIG. 4, according to the second embodiment.

The second embodiment of the present invention will be now described with reference to FIG. 7.

In the above-described first embodiment, the target compressor rotation speed $IVO_n$ is determined at step S23 in FIG. 5, which is different from steps S24–S27, based on the target air temperature TAO when the electric compressor 21 is started. However, in the second embodiment, the target compressor rotation speed $IVO_n$ is determined similarly to steps S24–S27 in FIG. 5, even in a case where the electric compressor 21 is started. Specifically, as shown in FIG. 7, the difference $E_n$ and the Edot are calculated at step S24a and step S25a, similarly to steps S24 and S25. Then, at step S26a, the incremental rotation speed Δf is calculated based on the difference $E_n$ between the target evaporator air temperature TEO and the evaporator air temperature TE. Then, at step S26b, the incremental rotation speed Δf is corrected to Δf' by multiplying a correction coefficient determined according to the air conditioning load, or by adding a correction factor determined according to the air conditioning load. Next, at step S27a, the target compressor rotation speed $IVO_n$ is determined by using the corrected incremental rotation speed Δf'. Even in the second embodiment, by correcting Δf to Δf' based on the air conditioning load, the temperature of air to be blown into the passenger compartment can be quickly reduced when the electric compressor 21 is started from a stop state. In the second embodiment, the other parts are similar to those of the above-described first embodiment.

(Third Embodiment)

Figure 8:
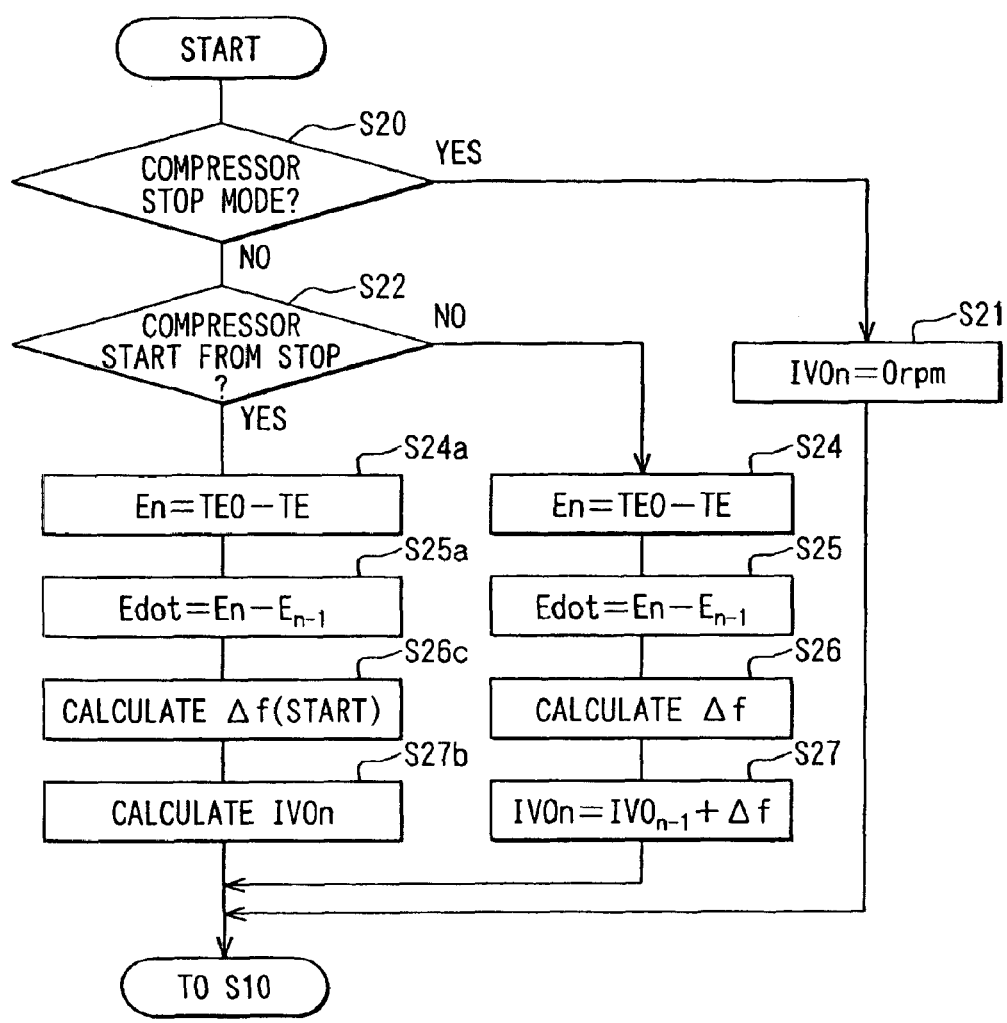
FIG. 8 is a flow diagram showing a compressor control in step S9 of FIG. 4, according to the third embodiment.

The third embodiment of the present invention will be now described with reference to FIG. 8.

In the above-described first embodiment, the target compressor rotation speed $IVO_n$ is determined at step S23 in FIG. 5, which is different from steps S24–S27, based on the target air temperature TAO when the electric compressor 21 is started. However, in the third embodiment, as shown in FIG. 8, when the electric compressor 21 is started at step S22, the difference $E_n$ between the target evaporator air temperature TEO and the evaporator air temperature TE, and the difference change rate Edot are calculated at steps S24a and S25a. Then, at step S26c, the target incremental rotation speed $\Delta f_{(START)}$ at the difference $E_n$ and the difference change rate Edot is calculated based on a predetermined start membership function and a start rule stored in the ROM. Here, the predetermined start membership function and the start rule are different from those at step S26. The target compressor rotation speed $IVO_n$ is determined at step S27b by using the calculated incremental rotation speed $\Delta f_{(START)}$.

Further, the start membership function and the start rule in the third embodiment can be changed according to the air conditioning load. In the third embodiment, the other parts are similar to those of the above-described first embodiment.

(Fourth Embodiment)

The fourth embodiment of the present invention will be now described with reference to FIGS. 9–12.

In the above embodiments, a predetermined condition where the rotation speed of the electric compressor 21 needs to be changed largely is a condition where the electric compressor 21 is started from the stopped state. In addition to this condition, a predetermined condition of the fourth embodiment includes a condition where the target compressor rotation speed IVO of the electric compressor 21 increases largely.

An air conditioner according to the fourth embodiment has three guard functions (control functions). A first and a second guard functions are used in order to prevent a passenger from feeling a noise, generated when the electric compressor 21 is driven, uncomfortably. Specifically, the first guard function restricts a maximum permissible rotation speed of the electric compressor 21 based on the vehicle speed, and the second guard function restricts the maximum permissible rotation speed of the electric compressor 21 based on an air blowing amount. A third guard function is used in order to prevent the vehicle from being in troubles while driving. Specifically, the third guard function restricts a maximum electric power consumption of the electric compressor 21, that is, the maximum permissible rotation speed of the electric compressor 21 based on the residual capacity degree of the battery 4.

The first guard function determines a first maximum permissible rotation speed based on the vehicle speed, so that the first maximum permissible rotation speed of the electric compressor 21 increases as the vehicle speed increases. To the contrary, the first maximum permissible rotation speed of the electric compressor 21 decreases as the vehicle speed decreases. The reason why the first maximum permissible rotation speed is set as described above will be now explained. Generally, a driving noise increases as the vehicle speed increases. Therefore, a noise generated by the electric compressor 21 is drowned out by the driving noise. As a result, a noise level in with the passenger feels uncomfortably increases.

Figure 9:
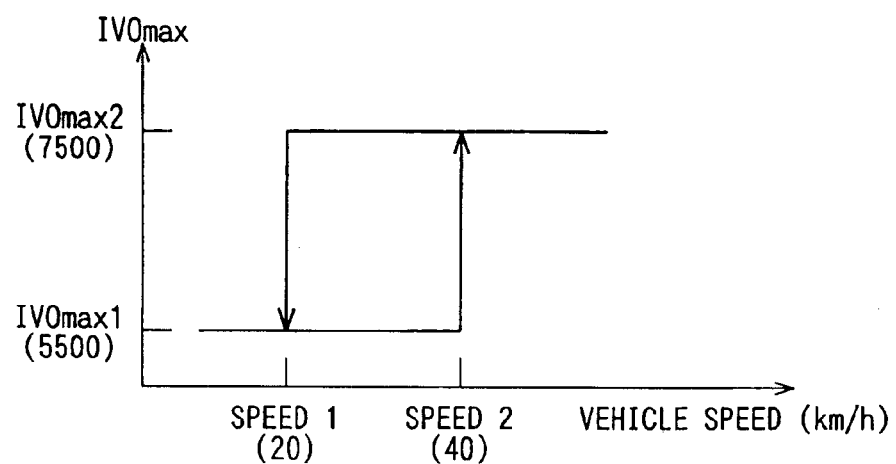
FIG. 9 is a graph showing a relationship between a vehicle speed and a first maximum permissible rotation speed in a compressor control according to a fourth embodiment of the present invention.

Specifically, as shown in FIG. 9, the first maximum permissible rotation speed is set to IVOmax1 (e.g., 5500 rpm) when the vehicle speed is not more than a first vehicle speed (e.g., 20 km/h) in decelerating of the vehicle. To the contrary, the first maximum permissible rotation speed is set to IVOmax2 (e.g., 7500 rpm) when the vehicle speed is larger than the first vehicle speed in decelerating of the vehicle.

Further, the first maximum permissible rotation speed is set to IVOmax1 when the vehicle speed is not more than a second vehicle speed (e.g., 40 km/h) in accelerating of the vehicle. To the contrary, the first maximum permissible rotation speed is set to IVOmax2 when the vehicle speed is larger than the second vehicle speed in accelerating of the vehicle.

The second guard function determines a second maximum permissible rotation speed based on air blowing amount, so that the second maximum permissible rotation speed increases as the air blowing amount of the blower 13 increases. To the contrary, the second maximum permissible rotation speed decreases as the air blowing amount decreases. The reason why the second maximum permissible rotation speed is set as described above will be now explained. Generally, an air blowing noise increases as the air blowing amount of the blower 13 increases. Therefore, the noise generated by the electric compressor 21 is drowned out by the air blowing noise. As a result, the noise level in which the passenger feels uncomfortably increases.

Figure 10:
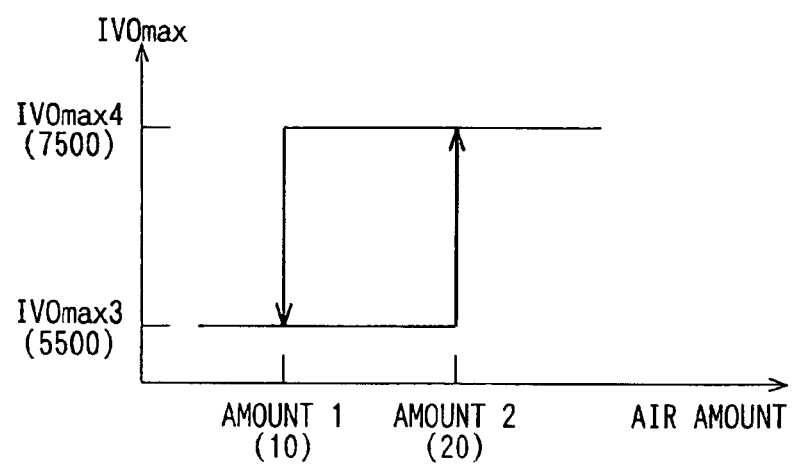
FIG. 10 is a graph showing a relationship between a blower air amount and a second maximum permissible rotation speed in the compressor control according to the fourth embodiment.

Specifically, as shown in FIG. 10, the second maximum permissible rotation speed is set to IVOmax3 (e.g., 5500 rpm) when the air blowing amount of the blower 13 is not more than a first air blowing amount (e.g., interior blower level 10) in descending of the air blowing amount of the blower 13. To the contrary, the second maximum permissible rotation speed is set to IVOmax4 (e.g., 7500 rpm) when the air blowing amount of the blower 13 is larger than the first air blowing amount in descending of the air blowing amount of the blower 13.

Further, the second maximum permissible rotation speed is set to IVOmax3 when the air blowing amount of the blower 13 is not more than a second air blowing amount (e.g., interior blower level 20) in increasing of the air blowing amount of the blower 13. To the contrary, the second maximum permissible rotation speed is set to IVOmax4 when the air blowing amount of the blower 13 is larger than the second air blowing amount in increasing of the air blowing amount of the blower 13.

The third guard function determines the third maximum permissible rotation speed based on the residual capacity degree of the battery 4. The third maximum permissible rotation speed increases as the residual charging degree of the battery 4 becomes larger. To the contrary, the third maximum permissible rotation speed decreases as the residual charging degree of the battery 4 becomes smaller.

Specifically, when the residual charging degree of the battery 4 is not more than a predetermined value (e.g., charging start target value), the hybrid ECU 7 inputs a signal representing this battery condition to the air-conditioning ECU 11. In this case, the third maximum permissible rotation speed is set to IVOmax5 (e.g., 5500 rpm). To the contrary, when the residual charging degree of the battery 4 is larger that the predetermined value, the hybrid ECU 7 inputs a signal representing this battery condition to the air-conditioning ECU 11. In this case, the third maximum permissible rotation speed is set to IVOmax6 (e.g., 7500 rpm) which is larger than IVOmax5.

In the fourth embodiment, as described above, the maximum permissible rotation speed is determined based on three parameters, that is, the vehicle speed, the air blowing amount of the blower 13 and the residual charging degree of the battery 4. The smallest value is determined as the target maximum value IVOmax, among the first, second and third maximum permissible rotation speeds. The electric compressor 21 is controlled so that the target compressor rotation speed IVO does not exceed the target maximum value IVOmax.

As described above, the target compressor rotation speed IVO is basically determined based on the air conditioning load such as the target air temperature TAO. However, in some cases, the target compressor rotation speed IVO determined based on the air conditioning load may exceed the target maximum value IVOmax. In this case, it is preferable that the rotation speed of the electric compressor 21 is increased quickly when the target maximum value IVOmax increases according to a change of vehicle driving condition and when the target compressor rotation speed IVO determined based on the air conditioning load is larger than the former value of the target maximum value IVOmax, that is, a value of the target maximum value IVOmax before it increases.

Accordingly, in the fourth embodiment, a condition where the target compressor rotation speed IVO of the electric compressor 21 increases largely is also included in the predetermined condition where the rotation speed of the electric compressor 21 needs to be changed largely in addition to the start condition where the electric compressor 21 is started from the stopped state. Furthermore, the target incremental rotation speed $\Delta f$ is increased when the target maximum value IVOmax increases, compared to a case where the target maximum value IVOmax does not increase. Thus, the rotation speed of the electric compressor 21 can be quickly increased to the target compressor rotation speed IVO.

Further, in the fourth embodiment, a predetermined rotation speed $\alpha$ is added to the incremental rotation speed $\Delta f$ that is a value when the target maximum value IVOmax does not change. Thus, the incremental rotation speed $\Delta f$ while the target maximum value IVOmax increases is determined. The additional rotation speed $\alpha$ is set to be larger as the target air temperature TAO decreases within a predetermined range of the target air temperature TAO.

Figure 11:
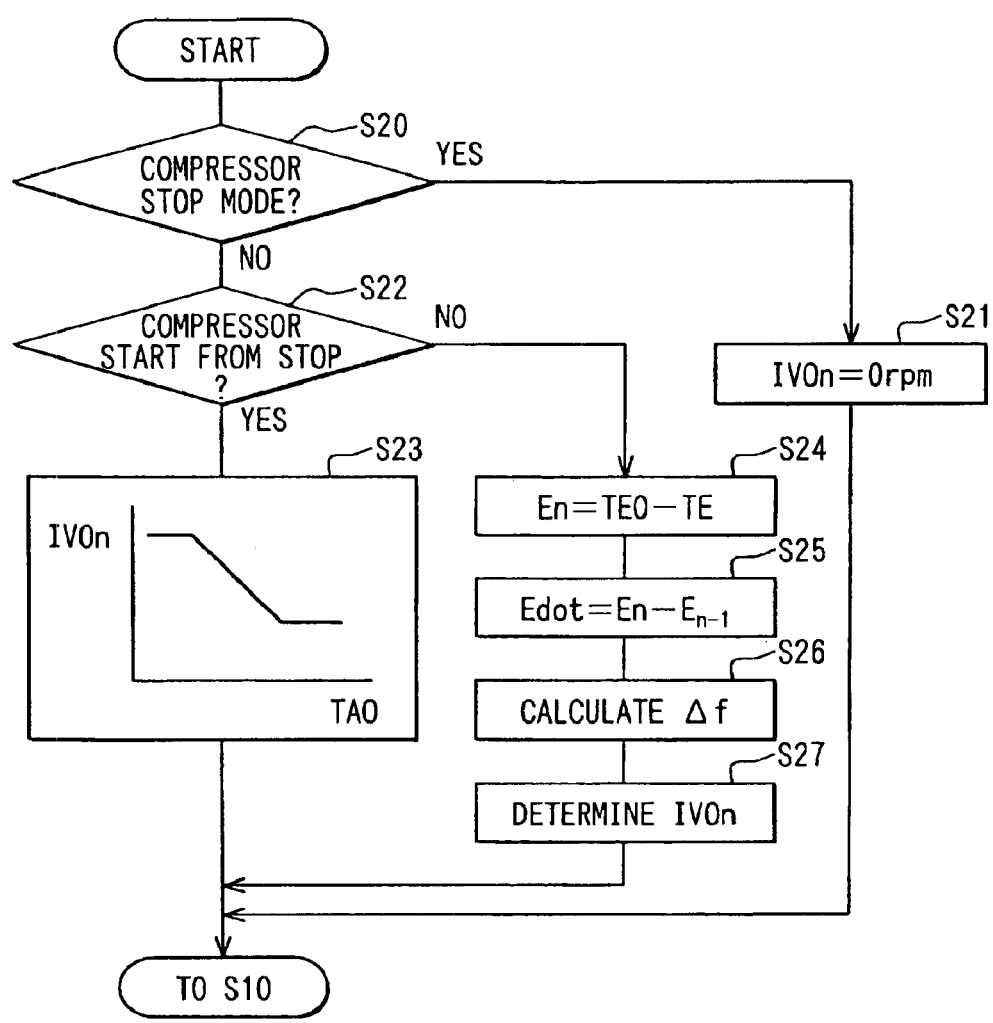
FIG. 11 is a flow diagram showing a compressor control in step S9 of FIG. 4, according to the fourth embodiment.
Figure 12:
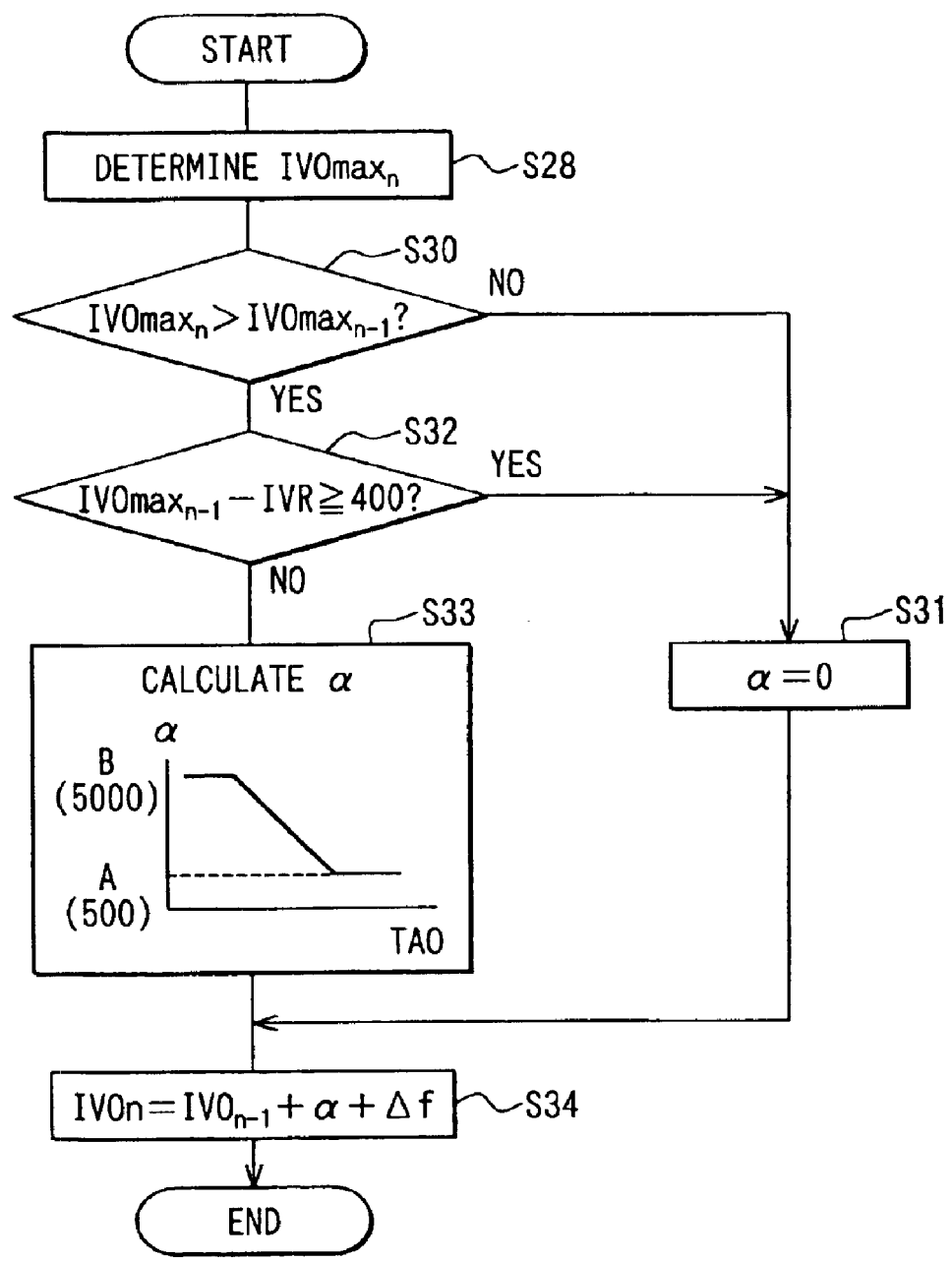
FIG. 12 is a flow diagram showing a control for determining a target compressor rotation speed, at step S27 in FIG. 11, according to the fourth embodiment.

In a flow diagram in FIG. 11, steps S20–S26 for determining the rotation speed of the electric compressor 21 in the fourth embodiment are the same as those of the first embodiment in FIG. 5. Only the determining process of the target compressor rotation speed $IVO_n$ at step S27 is different from that of the first embodiment in FIG. 5. FIG. 12 shows a detail control at step S27 in FIG. 11.

Next, the determining process of the target compressor rotation speed $IVO_n$ will be now described with respect to FIG. 12. First, the target maximum value $IVOmax_n$ is determined at step S28 as described above. Then, a former target maximum value $IVOmax_{n-1}$ and the present target maximum value $IVOmax_n$ calculated at the present time are compared at step S30. When the present target maximum value $IVOmax_n$ calculated at the present time is not more than the former target maximum value $IVOmax_{n-1}$, it is determined that the rotation speed of the electric compressor 21 does not need to be increased quickly. Therefore, the additional rotation speed α is set to 0 at step S31.

To the contrary, when the present target maximum value IVOmax$_n$ calculated at the present time is larger than the former target maximum value IVOmax$_{n-1}$, it is determined whether a difference between the former target maximum value IVOmax$_{n-1}$ and a present actual rotation speed IVR of the electric compressor 21 is not less than a predetermined rotation speed (e.g., 400 rpm) at step S32.

Here, an object of step S32 is to determine whether the present rotation speed of the electric compressor 21 is regulated not to excess the target maximum value IVOmax$_{n-1}$. Therefore, the predetermined rotation speed at step S32 is 0 rpm ideally. However, the predetermined rotation speed is set at 400 rpm because a detection error, a dispersion of the rotation speed and the like need to be taken into account.

Further, in the fourth embodiment, the actual rotation speed IVR is detected based on a control signal inputted from the air-conditioning ECU 11 to the electric compressor 21. However, the actual rotation speed IVR can be also detected based on a sensor signal from a rotation speed sensor provided in the electric compressor 21 in order to detect the rotation speed.

When a difference between the former target maximum value IVOmax$_{n-1}$ and the present actual rotation speed IVR of the electric compressor 21 is not less than the predetermined rotation speed, it is determined that the electric compressor 21 is controlled at the target compressor rotation speed IVO$_{n-1}$ determined based on the air conditioning load. Accordingly, the target incremental rotation speed Δf is not increased, that is, the additional rotation speed α is set to 0 at step S31.

When the difference between the former target maximum value IVOmax$_{n-1}$ and the present actual rotation speed IVR of the electric compressor 21 is smaller than the predetermined rotation speed, it is determined that the target compressor rotation speed IVO$_{n-1}$ determined based on the air conditioning load is not less than the former target maximum value IVOmax$_{n-1}$. Accordingly, the additional rotation speed α is determined based on the target air temperature TAO at step S33. Specifically, as shown in a graph at step S33 in FIG. 12, the additional rotation speed α is set to be larger as the target air temperature TAO decreases within a predetermined range of the target air temperature TAO.

Then, the target compressor rotation speed IVO$_n$ is determined by adding the incremental rotation speed Δf, determined similarly to the first embodiment, and the additional rotation speed α to the former target compressor rotation speed IVO$_{n-1}$ at step S34.

Next, operation and advantages of the air conditioner according to the fourth embodiment will be explained.

In the fourth embodiment, the condition where the target compressor rotation speed IVO of the electric compressor 21 increases largely is also included in the predetermined condition where the rotation speed of the electric compressor 21 needs to be changed largely, in addition to the condition where the electric compressor 21 is started from the stopped state. Therefore, the evaporator air temperature TE can be approximated to the target evaporator air temperature TEO faster than the control method disclosed in JP-A-2001-26214.

In the fourth embodiment, a sum of the incremental rotation speed Δf, the additional rotation speed α and the former target compressor rotation speed IVO$_{n-1}$ is determined as the target compressor rotation speed IVO$_n$. However, the fourth embodiment is not limited to this. For example, it is possible that the incremental rotation speed Δf is included in the additional rotation speed α. In this case, the target compressor rotation speed IVO$_n$ can be determined based on the following formula of IVO$_n$=IVO$_{n-1}$+α.

(Fifth Embodiment)

The fifth embodiment of the present invention will be now described with reference to FIG. 13.

In the fifth embodiment, similarly to the above-described fourth embodiment, the condition where the target compressor rotation speed IVO of the electric compressor 21 increases largely is also included in the predetermined condition where the rotation speed of the electric compressor 21 needs to be changed largely in addition to the condition where the electric compressor 21 is started from the stopped state. The difference between the fourth and the fifth embodiments is a determining process of the target compressor rotation speed IVO.

That is, in the fifth embodiment, the additional rotation speed α is determined based on a difference between the target evaporator air temperature TEO and the evaporator air temperature TE when the target maximum value IVOmax increases.

Specifically, when the difference between the target evaporator air temperature TEO and the evaporator air temperature TE is not less than a first predetermined value (e.g., 3–4 degrees), it is determined that the electric compressor 21 is in a transient state while the rotation speed of the electric compressor 21 is increased. In this case, the additional rotation speed α is set to be larger as the target air temperature TAO decreases within a predetermined range of the target air temperature TAO, similarly to the fourth embodiment.

Further, when the difference between the target evaporator air temperature TEO and the evaporator air temperature TE is smaller than the first predetermined value and is not less than a second predetermined value (e.g., −1–0 degrees), it is determined that the electric compressor 21 is in a stable state. In this case, the additional rotation speed α is set to be constant (e.g., 500 rpm).

Further, when the difference between the target evaporator air temperature TEO and the evaporator air temperature TE is smaller than the second predetermined value, the additional rotation speed α is set to 0 rpm.

Figure 13:
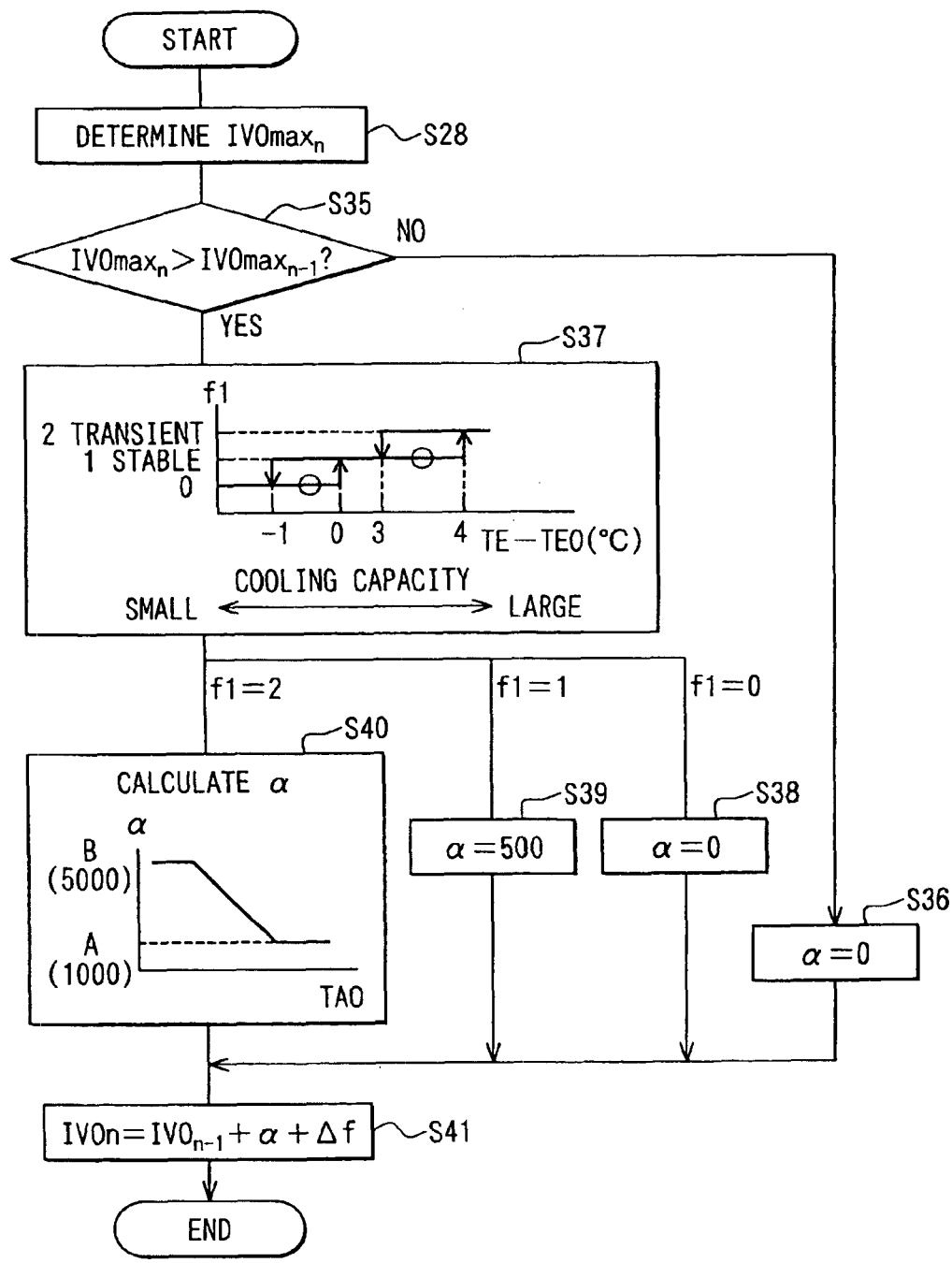
FIG. 13 is a flow diagram showing a control for determining a target compressor rotation speed, at step S27 in FIG. 11, according to a fifth embodiment of the present invention.

FIG. 13 shows a flow diagram for determining the target compressor rotation speed IVO$_n$ in the fifth embodiment. FIG. 13 corresponds to step S27 in FIG. 11.

In FIG. 13, the target maximum value IVOmax$_n$ is determined at step S28 as described above. The former target maximum value IVOmax$_{n-1}$ and the present target maximum value IVOmax$_n$ calculated at the present time are compared at step S35. When the present target maximum value IVOmax$_n$ calculated at the present time is not more than the former target maximum value IVOmax$_{n-1}$, it is determined that the rotation speed of the electric compressor 21 does not need to be increased quickly. Therefore, the additional rotation speed α is set to 0 at step S36.

To the contrary, when the present target maximum value IVOmax$_n$ calculated at the present time is larger than the former target maximum value IVOmax$_{n-1}$, an operation level f1 of the electric compressor 21 is determined based on the difference between the target evaporator air temperature TEO and the evaporator air temperature TE at step S37.

That is, when the difference between the target evaporator air temperature TEO and the evaporator air temperature TE is not more than 0 in an ascending of the difference between the target evaporator air temperature TEO and the evaporator air temperature TE, the operation level f1 is set to 0.

When the difference between the target evaporator air temperature TEO and the evaporator air temperature TE is larger than 0 and is not more than 4, the operation level f1 is set to 1. When the difference between the target evaporator air temperature TEO and the evaporator air temperature TE is larger than 4, the operation level f1 is set to 2.

When the difference between the target evaporator air temperature TEO and the evaporator air temperature TE is not more than −1 in a descending of the difference between the target evaporator air temperature TEO and the evaporator air temperature TE, the operation level f1 is set to 0. When the difference between the target evaporator air temperature TEO and the evaporator air temperature TE is larger than −1 and is not more than 3, the operation level f1 is set to 1. When the difference between the target evaporator air temperature TEO and the evaporator air temperature TE is larger than 3, the operation level f1 is set to 2.

When the operation level f1 is 0, the additional rotation speed α is set to 0 at step S38. When the operation level f1 is 1, the additional rotation speed α is set to 500 rpm at step S39. When the operation level f1 is 2, the additional rotation speed α is determined based on the target air temperature TAO at step S40 similarly to the fourth embodiment.

Then, the target compressor rotation speed $IVO_n$ is determined by adding the incremental rotation speed Δf, determined similarly to the first embodiment, and the additional rotation speed α to the former target compressor rotation speed $IVO_{n-1}$ at step S41.

Next, operation and advantages of the air conditioner according to the fifth embodiment will be explained.

In the fifth embodiment, the condition where the target compressor rotation speed IVO of the electric compressor 21 increases largely is also included in the predetermined condition where the rotation speed of the electric compressor 21 needs to be changed largely in addition to the condition where the electric compressor 21 is started from the stopped state. Therefore, the evaporator air temperature TE can be approximated to the target evaporator air temperature TEO faster than the control method disclosed in JP-A-2001-26214.

In the fifth embodiment, a sum of the incremental rotation speed Δf, the additional rotation speed α and the former target compressor rotation speed $IVO_{n-1}$ is determined as the target compressor rotation speed $IVO_n$. However, the fifth embodiment is not limited to this. For example, it is possible that the incremental rotation speed Δf is included in the additional rotation speed α. In this case, the target compressor rotation speed $IVO_n$ can be determined based on the following formula of $IVO_n = IVO_{n-1} + α$.

(Sixth Embodiment)

The sixth embodiment of the present invention will be now described with reference to FIG. 14. The sixth embodiment is a modification of the fifth embodiment. In the above-described fifth embodiment, the operation level f1 is determined based on the difference between the target evaporator air temperature TEO and the evaporator air temperature TE. In contrast, in the sixth embodiment, the operation level f2 is determined based on an inside air temperature TR detected by the inside air temperature sensor 11b and the set temperature Tset of the passenger compartment, set by the temperature setting lever on the control panel 11a.

Further, the temperature setting lever on the control panel 11a is used when a passenger sets the set temperature Tset. Generally, the set temperature Tset is set to about 25° C. when the vehicle is shipped.

In a determining process of the target compressor rotation speed IVO in the sixth embodiment, when the difference between the inside air temperature TR and the set temperature Tset is not less than a first predetermined value (e.g., 3–4 degrees), it is determined that the electric compressor 21 is in a transient state while the rotation speed of the electric compressor 21 is increased. In this case, similarly to the fourth embodiment, the additional rotation speed α is set to be larger as the target air temperature TAO becomes smaller within a predetermined range of the target air temperature TAO.

Further, when the difference between the inside air temperature TR and the set temperature Tset is smaller than the first predetermined value and is not less than a second predetermined value (e.g., −1–0 degrees), it is determined that the electric compressor 21 is in a stable state. The additional rotation speed α is set to be constant (e.g., 500 rpm).

Further, when the difference between the inside air temperature TR and the set temperature Tset is smaller than the second predetermined value, the additional rotation speed α is set to 0 rpm.

Figure 14:
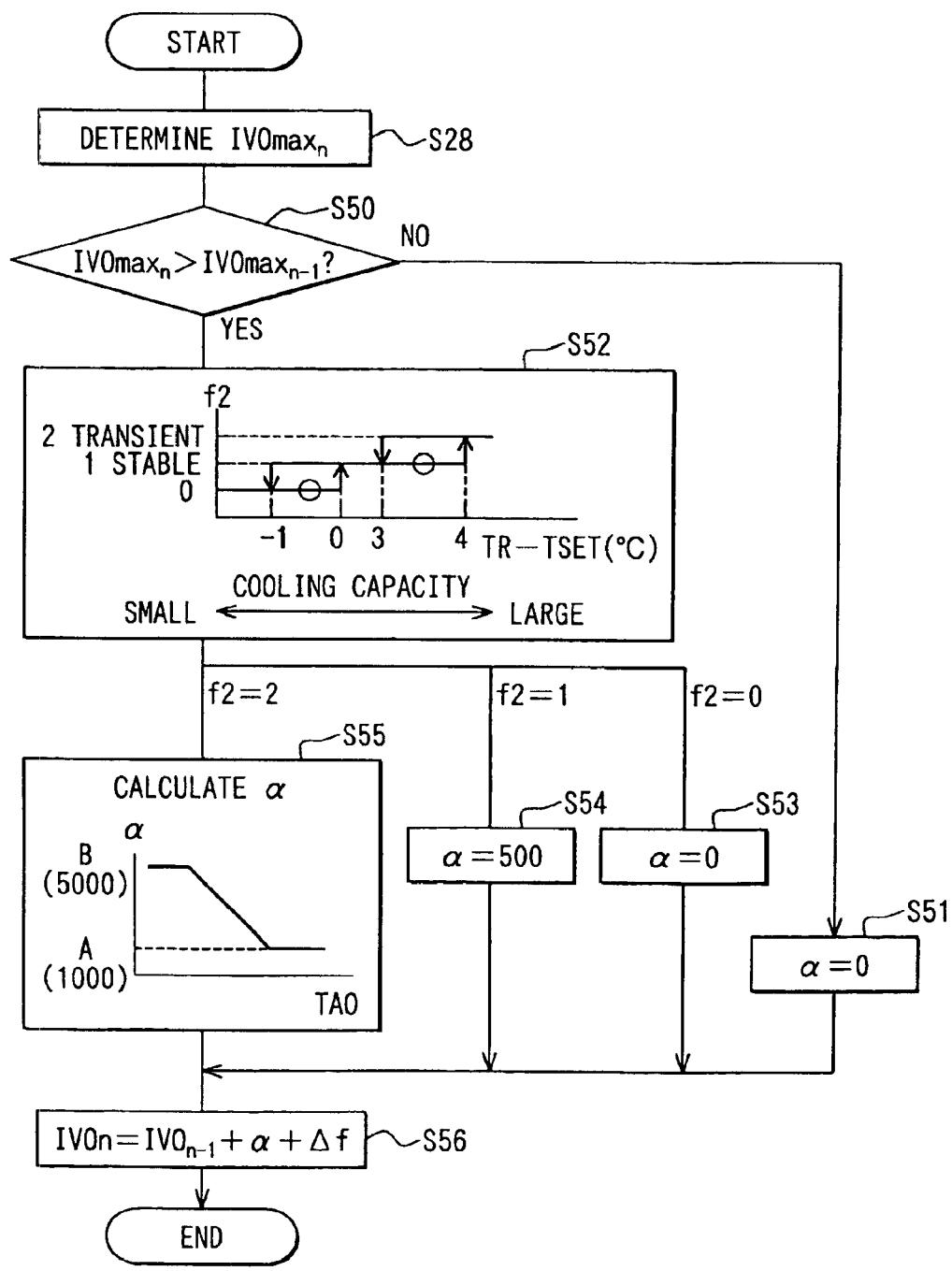
FIG. 14 is a flow diagram showing a control for determining a target compressor rotation speed, at step S27 in FIG. 11, according to a sixth embodiment of the present invention.

FIG. 14 shows a flow diagram for a determining the target compressor rotation speed $IVO_n$ in the sixth embodiment. FIG. 14 corresponds to step S27 in FIG. 11.

In FIG. 14, the target maximum value $IVOmax_n$ is determined at step S28 as described above. The former target maximum value $IVOmax_{n-1}$ and the present target maximum value $IVOmax_n$ calculated at the present time are compared at step S50. When the present target maximum value $IVOmax_n$ calculated at the present time is not more than the former target maximum value $IVOmax_{n-1}$, it is determined that the rotation speed of the electric compressor 21 does not need to be increased quickly. Therefore, the additional rotation speed α is set to 0 at step S51.

To the contrary, when the present target maximum value $IVOmax_n$ calculated at the present time is larger than the former target maximum value $IVOmax_{n-1}$, an operation level f2 is determined based on the difference between the inside air temperature TR and the set temperature Tset at step S52.

That is, when the difference between the inside air temperature TR and the set temperature Tset is not more than 0 in an ascending of the difference between the inside air temperature TR and the set temperature Tset, the operation level f2 is set to 0. When the difference between the inside air temperature TR and the set temperature Tset is larger than 0 and is not more than 4, the operation level f2 is set to 1. When the difference between the inside air temperature TR and the set temperature Tset is larger than 4, the operation level f2 is set to 2.

When the difference between the inside air temperature TR and the set temperature Tset is not more than −1 in a descending of the difference between the inside air temperature TR and the set temperature Tset, the operation level f2 is set to 0. When the difference between the inside air temperature TR and the set temperature Tset is larger than −1 and is not more than 3, the operation level f2 is set to 1. When the difference between the inside air temperature TR and the set temperature Tset is larger than 3, the operation level f2 is set to 2.

When the operation level f2 is 0, the additional rotation speed α is set to 0 at step S53. When the operation level f2 is 1, the additional rotation speed α is set to 500 rpm at step S54. When the operation level f2 is 2, the additional rotation speed α is determined based on the target air temperature TAO at step S55 similarly to the fourth embodiment.

Then, the target compressor rotation speed $IVO_n$ is determined by adding the incremental rotation speed Δf, determined similarly to the first embodiment, and the additional rotation speed α to the former target compressor rotation speed $IVO_{n-1}$ at step S56.

Next, operation and advantages of the air conditioner according to the sixth embodiment will be explained.

In the sixth embodiment, the condition where the target compressor rotation speed IVO of the electric compressor 21 increases largely is also included in the predetermined condition where the rotation speed of the electric compressor 21 needs to be changed largely in addition to the condition where the electric compressor 21 is started from the stopped state. Therefore, the evaporator air temperature TE can be approximated to the target evaporator air temperature TEO faster than the control method disclosed in JP-A-2001-26214.

In the sixth embodiment, a sum of the incremental rotation speed Δf, the additional rotation speed α and the former target compressor rotation speed $IVO_{n-1}$ is determined as the target compressor rotation speed $IVO_n$. However, the sixth embodiment is not limited to this. For example, it is possible that the incremental rotation speed Δf is included in the additional rotation speed α. In this case, the target compressor rotation speed $IVO_n$ can be determined based on the following formula of $IVO_n = IVO_{n-1} + \alpha$.

(Other Embodiments)

Although the present invention has been fully described in connection with the preferred embodiments thereof with reference to the accompanying drawings, it is to be noted that various changes and modifications will become apparent to those skilled in the art.

For example, in the above embodiments, the actual cooling capacity generated in the evaporator 25 is detected by using the evaporator blown air temperature sensor 11f. However, the present invention is not limited to this. For example, the actual cooling capacity can be determined by using at least one of a refrigerant pressure at a low-pressure side, a refrigerant temperature at a low-pressure side and a flowing amount of refrigerant.

In the above embodiments, the vapor compression refrigerant cycle 20 utilizes cooling capacity generated in the evaporator 25. However, the present invention is not limited to this. The present invention can be applied to a heating system which utilizes heat generated in the condenser 22 in the vapor compression refrigerant cycle 20.

In the above embodiments, sucked refrigerant flows inside the motor housing 21c in the electric compressor 21. However, the present invention is not limited to this, and discharged refrigerant may flow inside the motor housing 21c. In the above embodiments, the present invention is applied to the hybrid vehicle. However, the present invention is not limited to this.

In the above embodiments, the driving control circuit 21d is integrated with the electric motor 21b in the electric compressor 21. However, the present invention is not limited to this. In the above embodiments, freon (R134a) is used as refrigerant. However, the present invention is not limited to this. Natural refrigerant such as $CO_2$ and $N_2$ or refrigerant mixed more than two kinds of refrigerant can be also used.

Further, it is possible that a program including the above control processes is obtained, for example, through the internet and is updated. For example, an updating means for updating the control program based on a changing program may be provided. In addition, the present invention can be applied to an air conditioner for the other use, without being restricted to a vehicle.

Such changes and modifications are to be understood as being within the scope of the present invention as defined by the appended claims.

What is claimed is:

1. An air conditioner, comprising:

a vapor compression refrigerant cycle including a compressor for compressing refrigerant, and an interior heat exchanger for adjusting a temperature of air to be blown into a compartment by performing heat exchange between refrigerant circulating in the vapor compression refrigerant cycle and the air to be blown into the compartment;

an actual capacity detecting means for detecting an actual capacity of the interior heat exchanger;

a target capacity determining means for determining a target capacity of the interior heat exchanger;

a first target rotation-speed determining means for determining a first control target rotation speed of the compressor based on a difference between the actual capacity detected by the actual capacity detecting means and the target capacity determined by the target capacity determining means;

a changing condition determining means for determining whether a rotation speed of the compressor needs to be changed by a change rate larger than a change rate of the first control target rotation speed, determined by the first target rotation-speed determining means; and a second target rotation-speed determining means for determining a second control target rotation speed that is larger than the first control target rotation speed when the changing condition determining means determines that the rotation speed of the compressor needs to be changed by a change rate larger than the change rate of the first control target rotation speed.

2. The air conditioner according to claim 1, wherein the changing condition determining means determines that the rotation speed of the compressor needs to be changed by a change rate larger than the change rate of the first control target rotation speed, when the compressor is started from a stop state.

3. The air conditioner according to claim 1, further comprising a guard rotation speed determining means for determining a maximum permissible rotation speed of the compressor, wherein the changing condition determining means determines that the rotation speed of the compressor needs to be changed by a change rate larger than the change rate of the first control target rotation speed determined by the first target rotation-speed determining means when the maximum permissible rotation speed determined by the guard rotation speed determining means increases and a difference between the control target rotation speed determined by the first target rotation-speed determining means and an actual rotation speed of the compressor is larger than a predetermined value.

4. The air conditioner according to claim 1, further comprising a guard rotation speed determining means for determining a maximum permissible rotation speed of the compressor, wherein the changing condition determining means determines that the rotation speed of the compressor needs to be changed at a change rate larger than the change rate of the first control target rotation speed determined by the first target rotation-speed determining means when the maximum permissible rotation speed determined by the guard rotation speed determining means increases and a difference between the actual capacity detected by the actual capacity detecting means and the target capacity determined by the target capacity determining means is larger than a predetermined value.

5. The air conditioner according to claim 4, wherein the second target rotation-speed determining means determines the second control target rotation speed of the compressor based on a difference between the actual capacity detected by the actual capacity detecting means and the target capacity determined by the target capacity determining means.

6. The air conditioner according to claim 1, further comprising:

a guard rotation speed determining means for determining a maximum permissible rotation speed of the compressor;

an inside air temperature detecting means for detecting an air temperature inside the compartment; and a temperature setting unit for setting a requested temperature in the compartment, wherein the changing condition determining means determines that the rotation speed of the compressor needs to be changed by a change rate larger than the change rate of the second control target rotation speed determined by the first target rotation-speed determining means, when the maximum permissible rotation speed determined by the guard rotation speed determining means increases and a difference between the air temperature inside the passenger compartment, detected by the inside air temperature detecting means, and the requested temperature set by the temperature setting unit is larger than a predetermined value.

7. The air conditioner according to claim 6, wherein the second target rotation-speed determining means determines the second control target rotation speed of the compressor based on a difference between the air temperature inside the passenger compartment, detected by the inside air temperature detecting means, and the requested temperature set by the temperature setting means.

8. The air conditioner according to claim 1, wherein the second target rotation-speed determining means determines the second control target rotation speed of the compressor based on a target temperature of air blown into the compartment.

9. The air conditioner according to claim 1, wherein the second target rotation-speed determining means determines the second control target rotation speed of the compressor by correcting the first control target rotation speed determined by the first target rotation-speed determining means.

10. The air conditioner according to claim 9, wherein the second target rotation-speed determining means corrects the first control target rotation speed determined by the first target rotation-speed determining means based on an air conditioning load of the interior heat exchanger.

11. The air conditioner according to claim 1, wherein the second target rotation-speed determining means determines the second control target rotation speed of the compressor based on the air conditioning load of the interior heat exchanger.

12. A control system for controlling an air conditioner, the air conditioner including a vapor compression refrigerant cycle having an interior heat exchanger for adjusting a temperature of air to be blown into a compartment by performing heat exchange between refrigerant circulating in the vapor compression refrigerant cycle and the air to be blown into the compartment, and a compressor for compressing refrigerant, the control system comprising:

an actual capacity detecting means for detecting an actual capacity of the interior heat exchanger;

a target capacity determining means for determining a target capacity of the interior heat exchanger;

a first target rotation-speed determining means for determining a first control target rotation speed of the compressor based on a difference between the actual capacity detected by the actual capacity detecting means and the target capacity determined by the target capacity determining means;

a changing condition determining means for determining whether a rotation speed of the compressor needs to be changed by a change rate larger than a change rate of the control target rotation speed, determined by the first target rotation-speed determining means; and a second target rotation-speed determining means for determining a second control target rotation speed larger than the control target rotation speed determined by the first target rotation-speed determining means when the changing condition determining means determines that the rotation speed of the compressor needs to be changed by a change rate larger than the change rate of the first control target rotation speed.

* * * * *